United States Patent [19]
Nye et al.

[11] Patent Number: 6,144,659
[45] Date of Patent: *Nov. 7, 2000

[54] TELECOMMUNICATION EQUIPMENT SUPPORT OF HIGH SPEED DATA SERVICES

[75] Inventors: Robert Alan Nye, Plainfield; Carl Robert Posthuma, Wheaton, both of Ill.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/767,138

[22] Filed: Dec. 19, 1996

[51] Int. Cl.$^7$ .................................................. H04M 11/06
[52] U.S. Cl. .......................... 370/359; 370/420; 370/463; 370/493; 379/93.01
[58] Field of Search ..................................... 370/359, 522, 370/395, 420, 486, 458, 904, 431, 463, 487, 488, 493, 497; 325/308; 379/93.01, 93.09

[56] References Cited

U.S. PATENT DOCUMENTS

| | | | |
|---|---|---|---|
| 5,365,577 | 11/1994 | Davis et al. ..................... | 379/93.09 X |
| 5,408,260 | 4/1995 | Arnon .......................................... | 348/6 |
| 5,528,688 | 6/1996 | Schorr ..................................... | 379/413 |
| 5,534,912 | 7/1996 | Kostreski .................................... | 348/6 |
| 5,682,385 | 10/1997 | Garcia et al. ........................... | 370/458 |
| 5,805,591 | 9/1998 | Naboulsi et al. ....................... | 370/395 |
| 5,812,786 | 9/1998 | Seazholtz ................................. | 709/233 |
| 5,815,505 | 9/1998 | Mills ........................................ | 370/522 |
| 5,889,856 | 3/1999 | O'Toole et al. ........................ | 379/399 |
| 5,909,455 | 6/1999 | Schneider ................................ | 370/468 |

OTHER PUBLICATIONS

Cook, J. et al: "ADSL and VADSL Splitter Design And Telephony Performance", IEEE Journal On Selected Areas in Communications, New York, vol. 13, No. 9, pp. 1634–1642, XP000543160 ISSN: 0733-8716.

Primary Examiner—Michael Horabik
Assistant Examiner—William H. Wilson, Jr.
Attorney, Agent, or Firm—Charles L. Warren

[57] ABSTRACT

A line interface unit terminates individual subscriber lines and supports conventional telephone service and high speed data service. It provides an interface between subscriber customer premises equipment and central office equipment. The use of large diplex filters is not required in order to terminate subscriber lines at the central office while providing high speed data services.

23 Claims, 4 Drawing Sheets

TELECOMMUNICATION EQUIPMENT SUPPORT OF HIGH SPEED DATA SERVICES

BACKGROUND OF THE INVENTION

This invention relates to telecommunications equipment which terminates subscriber lines and supports high speed data service for subscribers. The invention is especially suited, but not limited to, providing high speed data services which exceed the capability of conventional POTS terminating equipment.

In the United States, subscribers are commonly provided with telephone services known as plain old telephone services (POTS). Such services include providing conventional dial-tone and automated dialing features including the use of dual frequency tone signaling to communicate dialed number information. Additional modem telephone features including conferencing, call waiting, incoming caller identification, and other commercially available features.

Subscribers utilize a POTS line to carry conventional modem signals controlled by a personal computer to another modem via the public switch telephone network. Modems are currently available which advertise data communication rates up to 33.6 kilobits per second over dial-up analog subscriber lines. New modems have been announced which are to be capable of data communications up to 56 kilobits per second. Those skilled in the art will understand that the maximum data rate which can be transmitted using modems over a POTS subscriber line is limited by the sampling rate, the bandwidth of the channel, and the rate by which the analog signals are converted to digital signals by the line card units which terminate each POTS line at a central office. Thus, conventional modem data rates are limited by the POTS line cards which terminate the subscriber lines.

It is well known that subscribers in the United States can lease special subscriber lines from their telephone providers which accommodate higher data rates than are supported by conventional dial-up subscriber lines. Such higher speed lines utilize different terminating circuitry at the central office to accommodate higher data rates. For example, integrated services digital network (ISDN) terminating equipment will provide a subscriber with the capability of higher data rates than a conventional POTS terminated line. The known asynchronous digital subscriber line (ADSL) technique which is supported by available equipment provides a significantly higher data rate to a subscriber over a conventional copper two-wire subscriber line. Of course, the ADSL service requires proper terminating equipment at the central office and at the consumer premises to accommodate the greater throughput capabilities, i.e. data rates.

Figure 1:
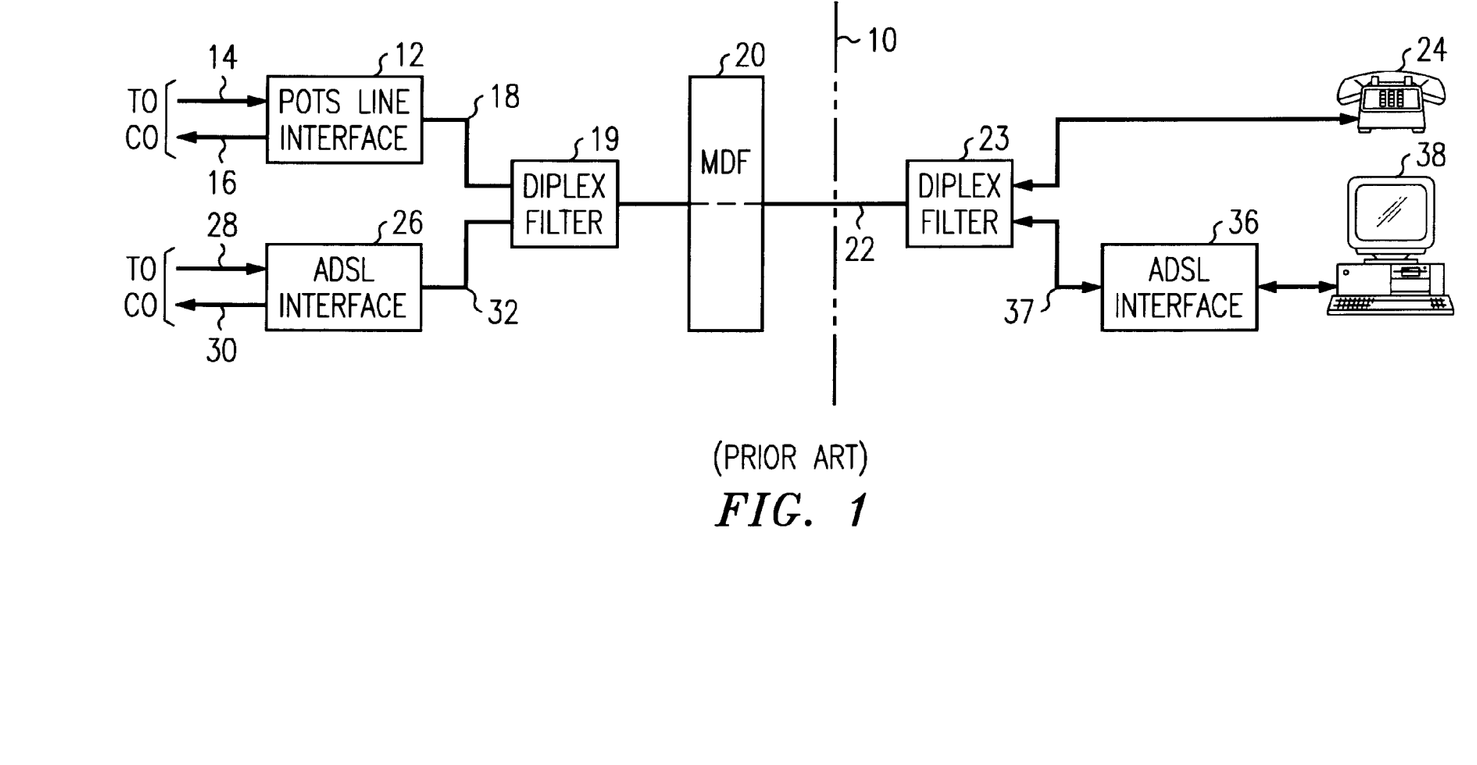
FIG. 1 illustrates a prior art implementation in which a subscriber is provided POTS and high speed data services by using a diplex filter to support line termination equipment.

FIG. 1 illustrates currently available services in the United States to subscribers using conventional two wire copper loops. Equipment to the right of dashed line 10 represents customer premises equipment (CPE); equipment to the left of line 10 represents central office line termination equipment. The POTS line interface 12, also known as a line card, provides an interface between digital incoming and outgoing communication lines 14 and 16, and analog signals carried on subscriber line 18. For example, lines 14 and 16 may carry 64 kilobit per second pulse code modulation (PCM) signals representative of analog information received from and transmitted to line 18. A main distribution frame (MDF) 20 is used to interconnect a plurality of incoming subscriber lines to various terminating equipment at the central office. In this example, line 18 is connected through a diplex filter 19 and MDF 20 to subscriber line 22. A conventional telephone instrument 24 at the consumer's premises is connected through diplex filter 23 to subscriber line 22.

FIG. 1 also illustrates another service to the subscriber which provides a high speed data capability. An ADSL interface circuit 26 provides an interface between the central office and the subscriber for transmitting and receiving data at rates up to several Megabits per second. Lines 28 and 30 provide inbound and outgoing digital data communications representative of information to and from the subscriber carried on line 32. Line 32 is connected via diplex filter 19 and MDF 20 to subscriber line 22. An ADSL interface 36 provides an interface between conventional digital data communicated with a user's personal computer 38 and ADSL analog format signaling communicated on line 37. The diplex filter 23 couples the ADSL signal between ADSL interface 36 and subscriber line 22. The advantage to the user is that the ADSL facilities support a substantially higher data rate than would be available if the subscriber utilized communications terminated via the POTS line interface 12.

A disadvantage illustrated in FIG. 1 is that diplex filters 19 and 23 are required. These known diplex filters function to separate the higher frequency signals associated with ADSL signaling from the lower frequency signals (typically <4 Kilohertz) associated with the conventional POTS communications. The conventional diplex filters consist of a lattice of inductors and capacitors that provides the needed filtering while maintaining direct current (DC) continuity required to support battery feed current for POTS service. Because of the DC which must be carried and the voltages which are encountered, such as during ringing, the inductors used in the diplex filters occupy a relatively large volume. Thus, a conventional diplex filter occupies a significant amount of space, for example about 90 cubic centimeters. The size of these filters and the wiring associated with connecting them to the MDF, ADSL interface, and the POTS line interface take up precious space in the terminating equipment cabinets where space is limited. This problem is magnified as more and more subscribers request such service. Therefore, a need exists to provide such high speed services while minimizing the space and wiring requirements especially at the terminating equipment.

SUMMARY OF INVENTION

It is an object of the present invention to address the above referenced need by providing a solution which minimizes the space and wiring associated with the central office terminating equipment for high speed data services.

In accordance with one embodiment of the present invention, access interface units terminate subscriber lines by which the corresponding subscribers can utilize POTS services and/or high speed data services such as ADSL. The access interface units support both types of service without utilizing a conventional diplex filter. The access interface units include a line support circuit wherein two way communications on the subscriber loop are separated into inbound and outbound communications on separate channels. The inbound communications are split into first and second signals. The first signal is low pass filtered and converted into digital format signals by a Codec. The second signal is high pass filtered and converted into digital format signals by a high speed data receiver. The outbound communications is the summation of third and fourth analog signals from a Codec and high speed data transmitter. An important aspect of this invention resides in the ability to use conventional low voltage, low current passive and active components for the low pass and high pass filters. These filters do not have to accommodate high voltage ringing signals nor the DC battery feed current needed by POTS telephones since the high voltage ringing signals and battery feed are provided by the line support circuit.

DETAILED DESCRIPTION

In accordance with the present invention, a single subscriber line supports at least two different classes of subscriber service, e.g. POTS and high speed data services such as XDSL. The "X" in XDSL represents one of a family of digital subscriber line services, such as ADSL (Asynchronous), RDSL (Rate-adaptive), and VDSL (Very high speed). As used herein "high speed data interface" refers to apparatus that uses a signaling method to provide higher data transmission speeds than can be supported by conventional POTS line terminating equipment.

Figure 2:
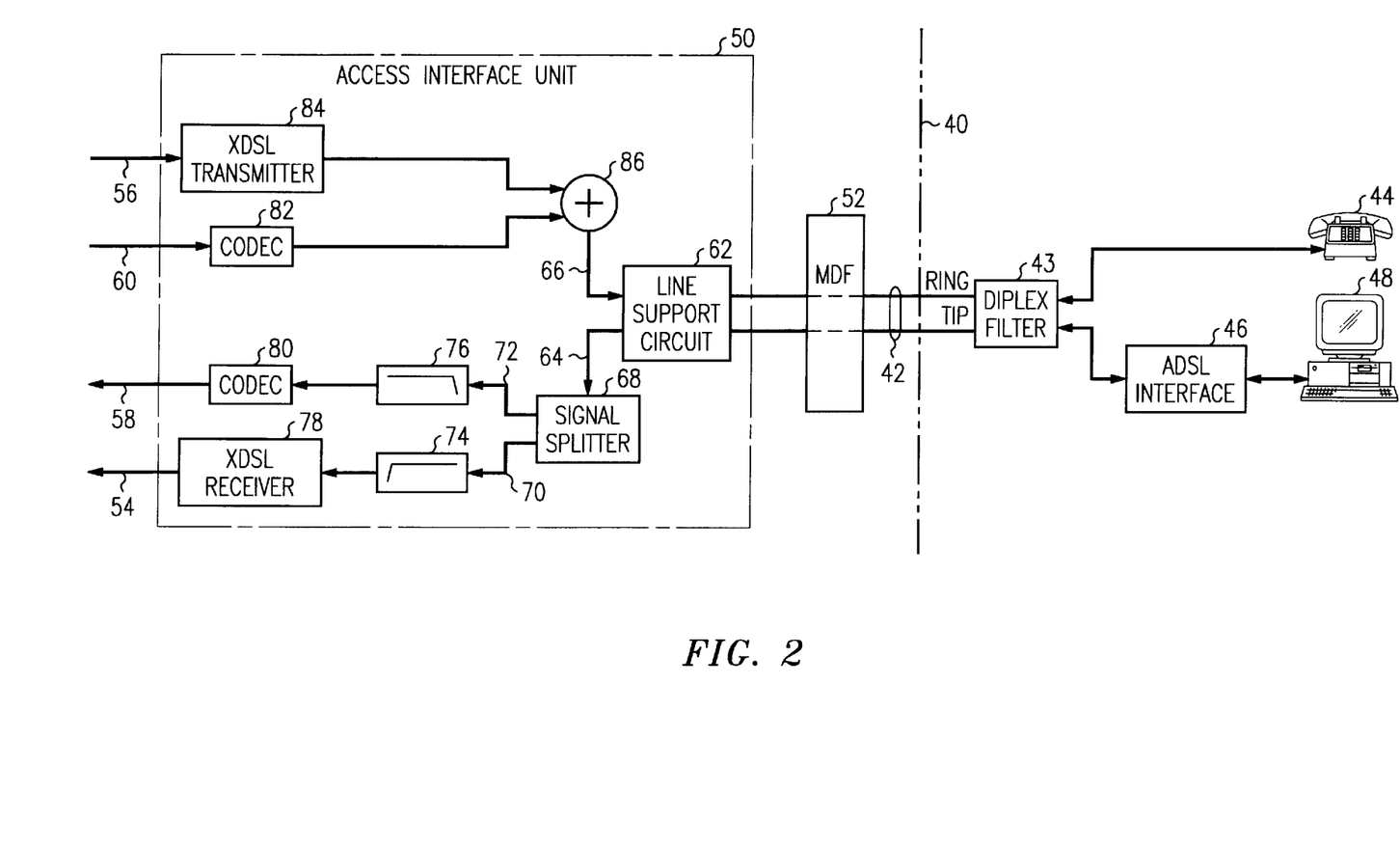
FIG. 2 illustrates an embodiment of the present invention where an access interface unit accommodates POTS and high speed data services over a single subscriber line without requiring a conventional diplex filter at the terminating central office equipment.

Referring to FIG. 2, consumer premises equipment is located to the right of dashed line 40; central office equipment including line terminating equipment is located to the left of dashed line 40. A two-wire copper subscriber line 42, also known as a subscriber loop, connects consumer premises equipment located to the right of line 40 with central office terminating equipment to the left of line 40. The subscriber may utilize a conventional telephone instrument 44 which can be connected to subscriber line 42 via a diplex filter 43 to receive POTS. The subscriber may elect to couple a high speed data interface, e.g., XDSL interface 46, via diplex filter 43 to subscriber line 42 to support high speed data communications. A personal computer 48 is illustratively shown connected to XDSL interface 46. It will be appreciated by those skilled in the art that equipment other than personal computer 48 may be utilized to transmit or receive a variety of data representing different types of information.

An access interface unit (AIU) 50 terminates subscriber line 42 via MDF 52. The AIU 50 is responsible for all interactions and communication signals transmitted to and received from subscriber line 42. Additionally, AIU 50 is responsible for providing separate inbound and outbound data paths for communicating information with the central office switch such as utilizing PCM encoded digital signals or asynchronous transfer mode (ATM) format signals. Communication channels 54 and 56 carry inbound and outbound high speed digital information, respectively. Communication channels 58 and 60 similarly carry inbound and outbound conventional telephone information, respectively.

Line support circuit 62 terminates subscriber line 42 and provides conventional POTS subscriber line support facilities. The line support circuit 62 provides the simplex to duplex communications interface by which duplex communications on subscriber line 42 are separated into independent transmit and receive communications coupled to the central office. Line 64 carries information from the subscriber and line 66 carries information to be transmitted to the subscriber. Line 64 is coupled to signal splitter 68 which splits the information received from the subscriber into two substantially equal signals, one signal being applied to line 70 and the other signal being applied to line 72. Line 70 is coupled to high pass filter 74 and line 72 is coupled to low pass filter 76. The outputs from the high pass filter 74 and low pass filter 76 are coupled respectively to the XDSL receiver 78 and CODEC (COder-DECoder) 80. The low pass filter 76 passes signals with frequencies relevant for conventional voice communication, such as below four Kilohertz, to the CODEC which translates the analog voice signals into digital signals such as PCM which are transmitted on line 58 to central office equipment. High pass filter 74 passes signals with frequencies above the cut-off frequency of filter 76, e.g. above 4 Khz, as used in known XDSL signal encoding (between about 30 kilohertz and 1500 kilohertz for ADSL). The XDSL receiver 78 converts the high pass filtered signals into other conventional signals such as ATM signals transmitted on channel 54 to the central office equipment.

Information transmitted to subscriber line 42 is received from central office facilities on communication channels 60 and 56. The CODEC 82 receives digital information, such as PCM formatted voice or data, to be translated into conventional POTS analog signals. Digital data, such as in ATM format, is received on communication channel 56 via XDSL transmitter 84 which converts this data into corresponding XDSL analog signals which are transmitted to signal combiner 86. Likewise, the analog output from CODEC 82 is sent to combiner 86 which sums the input analog signals into a resulting output signal carried on line 66 to line support circuit 62.

Figure 3:
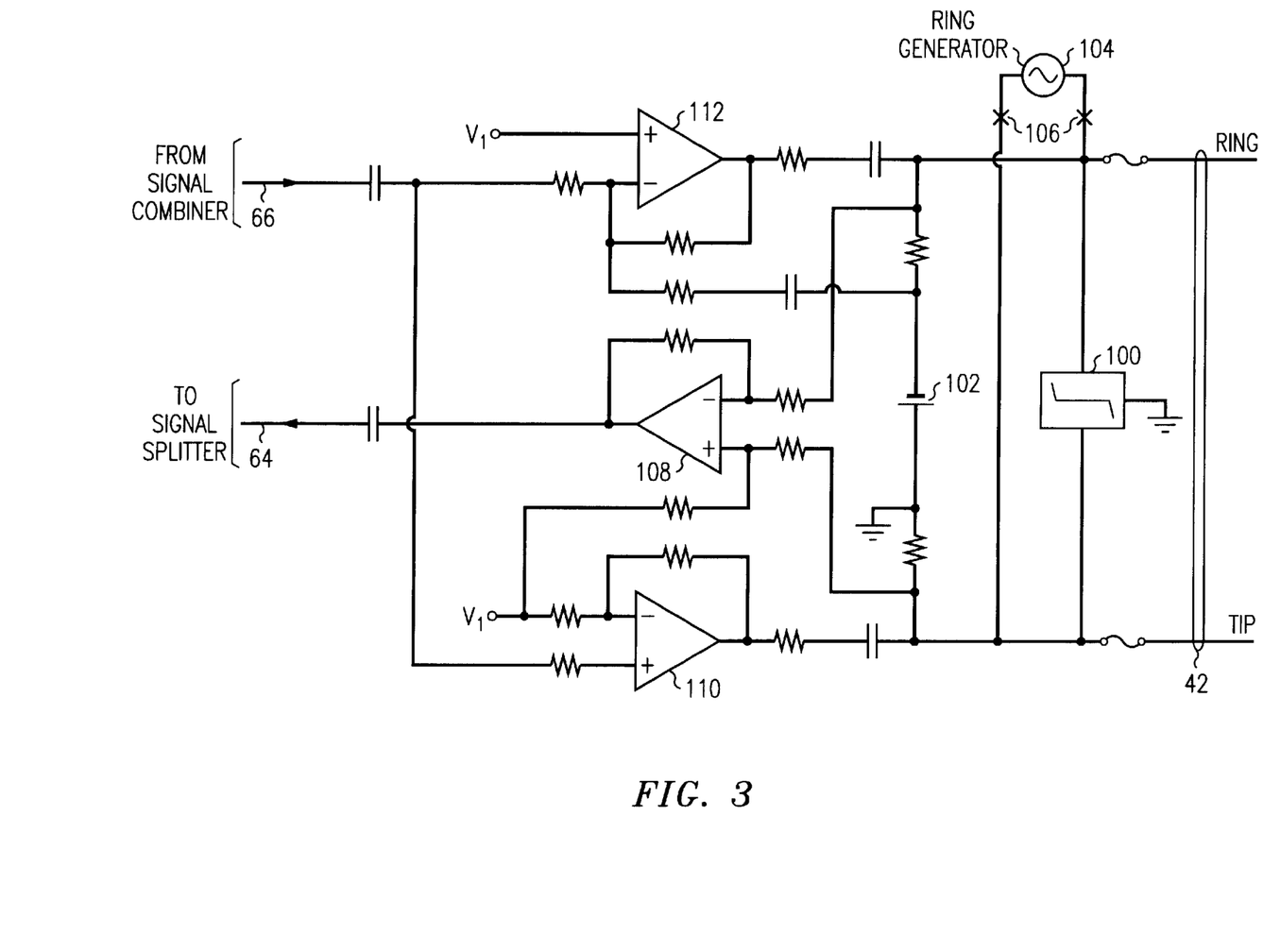
FIG. 3 illustrates an exemplary embodiment of the line support circuit as shown in FIG. 2.

FIG. 3 is an illustrative embodiment of line support circuit 62. The tip (T) and ring (R) conductors define subscriber line 42. An over voltage protection device 100 is used to limit the maximum voltages which can appear across the subscriber line 42. A source of DC current such as central office battery 102 provides a known driving current supplied to conventional POTS subscriber lines. A ring generator 104 provides a source of ringing voltage to the subscriber lines as needed. Normally open relay contacts 106 are driven by a relay (not shown) in a manner generally known in the art to apply ringing voltage across the subscriber line to indicate an incoming call. Operational amplifier 108 is connected with inputs to subscriber line 42 and provides an amplified signal replica of information transmitted from the subscriber to its output coupled to line 64. Operational amplifiers 110 and 112 obtain an input signal from line 66 from the signal combiner. The respective outputs from amplifiers 110 and 112 are coupled to the tip and ring lines of subscriber line 42. These amplifiers transmit signals from the central office to the subscriber line.

Additional details of operation concerning the circuit as shown in FIG. 3 may be obtained by referencing U.S. Pat. No. 5,528,688, which is incorporated herein by reference. In accordance with the present invention, the capacitors shown in FIG. 3 in series with the input and output signals are selected to have a capacitance value when considered with the corresponding equivalent resistances to pass the required frequency bandwidth to handle both conventional POTS services and XDSL services. That is, the components of this circuit are selected to provide a frequency bandwidth extending between approximately 20 hertz and 1.5 megahertz. When conventional POTS class of services is being utilized, low pass filter 76 as shown in FIG. 2 is utilized to eliminate any unwanted higher frequency signal components which may be present due to the extended frequency bandwidth needed to accommodate XDSL signaling. It will be apparent to those skilled in the art that additional known circuitry, not shown in FIG. 3 is required to support POTS. For example, conventional circuits would be used to provide off-hook detection, and processing of control signals associated with the provisioning of POTS services. Such other conventional circuitry is not illustrated in order to simplify the explanation of the embodiment of the present invention.

Figure 4:
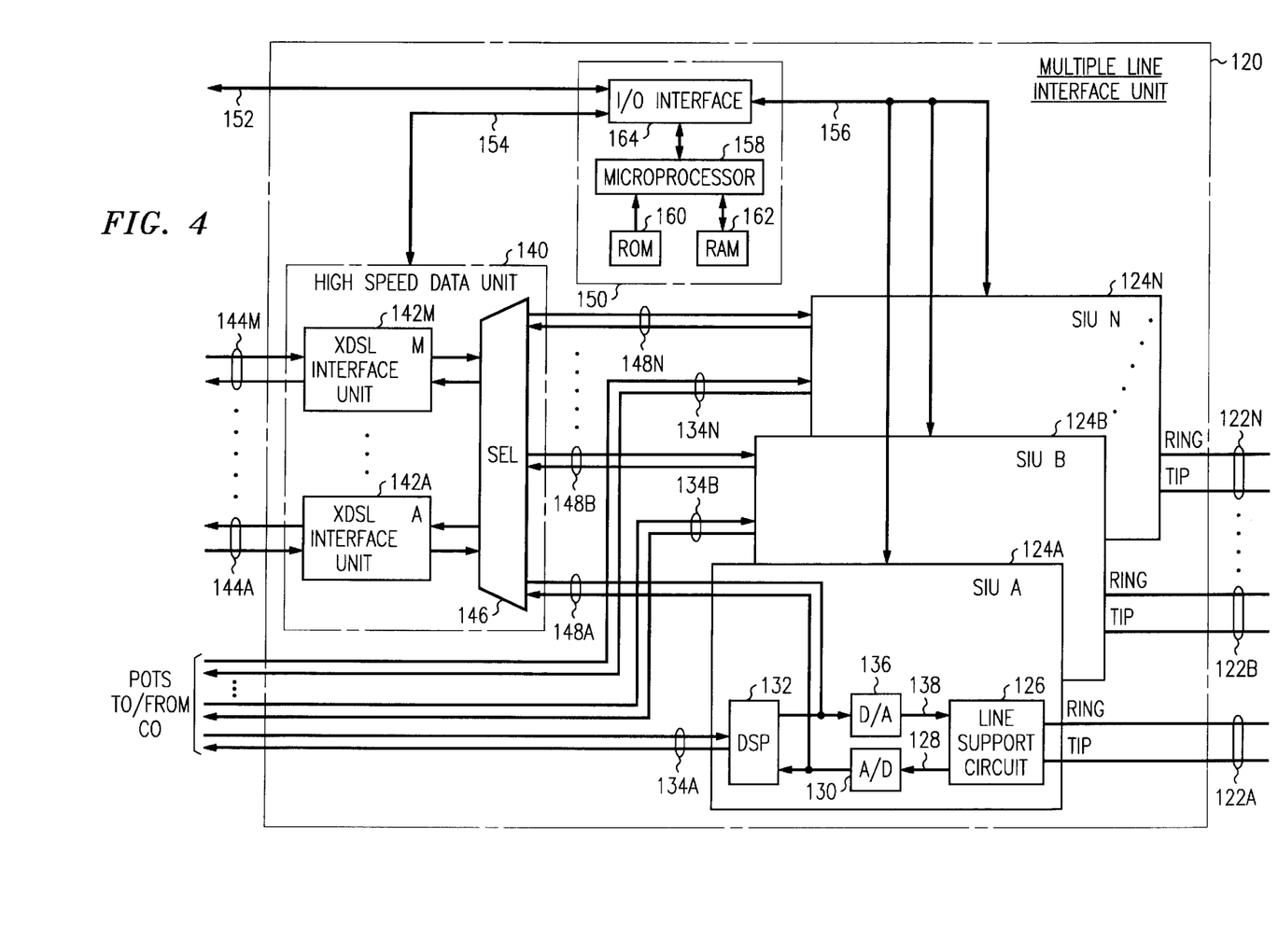
FIG. 4 illustrates another embodiment of the present invention in which a multiple line interface unit terminates several subscriber lines and shares high speed data resources among the subscriber lines.

FIG. 4 illustrates an alternative embodiment of the present invention. In this embodiment, a multiple line interface unit (MLIU) 120 terminates subscriber lines 122A, 122B, . . . 122N by corresponding subscriber interface units (SIU) 124A, 124B, . . . 124N. Since each of the SIUs are identical and support POTS service for each respective subscriber line, only SIU 124A will be described. SIU 124A includes a line support circuit (LSC) 126 such as shown in FIG. 3. Inbound analog information from LSC 126 is coupled on line 128 to analog to digital converter 130 which sends the digitized information to digital signal processor (DSP) 132. The DSP 132 processes the digitized information, converts it into a format such as PCM used by the central office, and sends the PCM signals to the central office on the inbound path of lines 134. Outbound PCM signals from the central office on the outbound path of lines 134 are received by DSP 132 and converted back into digital signals which can be directly translated by digital to analog converter 136 into analog signals sent on line 138 to LSC 126. Thus, each SIU supports POTS for the respective subscriber line.

In accordance with this embodiment, a high speed data unit (HSDU) 140 supports high speed data services such as XDSL for a predetermined number of subscriber lines and is shared among the subscriber lines, i.e. among the SIUs. This is done to make the MLIU 120 more economical as compared with an approach where high speed data interfaces are provided on a one to one basis for each subscriber line. HSDU 140 includes XDSL interface units 142A . . . 142M which comprise XDSL transceivers that translate the digitized subscriber information into XDSL formatted information transmitted and received on lines 144A . . . 144M to the central office such as via ATM facilities. A selector 146 selects which of the interface units 142A . . . 142M will be connected via lines 148A, 148B, . . . 148N to respective SIUs 124A, 124B, . . . 124N. Since M is an integer less than N, not all SIUs can be concurrently provided with high speed data services. While this is a limitation, the number of subscribers requesting high speed data services at any given time can be forecast and the M/N ratio determined to provide a targeted class of service.

Lines 148A . . . 148N support the flow of digital information between the SIUs and HSDU. Filtering of unwanted high frequency components associated with the high speed data is incorporated using known digital filtering techniques by the DSPs on the SIUs. Similarly, the filtering of unwanted low frequency components associated with the high speed data can be incorporated into the interface units 142A . . . 142M. Alternatively, such filtering could be accomplished in the analog domain before conversion of the analog signals associated with the line support unit into digital signals. In that case, the filtered analog signals would be sent via lines 148A . . . 148N to the HSDU and the interface units 142A . . . 142M would process the filtered analog signals. An important aspect of the invention resides in not having to provide such filtering at the "front end" of the line support circuit where ringing signals and battery feed requirements place further demands on such filtering.

A controller 150 provides call processing communications and instructions among the central office via line 152, HSDU 140 via line 154, and the SIUs via line 156. A microprocessor 158 is supported by read only memory (ROM) 160, and random access memory (RAM) 162. The microprocessor 158 is connected to input/output interface 164 which supports the receipt and transmission of signals over lines 152, 154 and 156. Call processing instructions and status information are communicated on line 152 between the central office and MLIU 120 via controller 150. Instructions are communicated on line 154 to HSDU 140 to control the path selections made by selector 146. Call processing information is carried on line 156 between controller 150 and the SIUs.

It will be apparent to those skilled in the art that various implementations of the present invention is possible. For example, very large scale integration (VLSI) techniques could be used to construct a multiple line interface unit wherein the required functions in the SIUs could be provided in a common shared circuit. A DSP with sufficient power and capabilities could service several if not all of the SIUs. Further, common functions of the XDSL interface units suggest several if not all of these units could be combined into a shared processing circuit or chip. It is also contemplated that the functions of the HSDUs and the SIUs could be combined in whole or in part by a sufficiently powerful DSP or DSPs or a computing system. Alternatively, the internal components of the MLIU could be segregated by analog and digital functions.

An example of a subscriber receiving XDSL services is explained below with regard to the embodiment shown in FIG. 4. The following steps describe providing XDSL services for the subscriber as the called party.

1. The central office equipment sends a call setup message by channel 152 to controller 150. The central office setup message identifies the subscriber line to which high speed data services is to be provided. Controller 150 maintains a stored table that correlates subscriber lines to corresponding subscriber interface units, and hence the SIU to receive XDSL information is known based on the identity of the subscriber line.

2. Controller 150 generates a command transmitted via communication path 156 to SIU 124A supporting subscriber line 122A. The subscriber served by subscriber line 122A is the party to receive XDSL communications in this illustrative example.

3. Controller 150 generates another command signal transmitted on line 154 to the HSDU 140 (selector 146) which identifies input line 148A to be utilized to provide XDSL communications with line interface unit 124A. Controller 150 stores a table of availability of the interface units 142A . . . 142M and assigns a not in use high speed interface unit such as 142A to handle the XDSL communications with subscriber line 122A.

4. Following the establishment of a communication path between the subscriber line 122A and the HSDU 140, controller 150 sends a reply message via channel 152 to the central office equipment confirming that the requested XDSL communication path has been established and identifying the high speed data unit 142A and corresponding line 144A which will carry the subject XDSL communications between the central office equipment and MLIU 120. Thus, a completed path to the central office is now available to carry XDSL communications with customer premises equipment coupled to subscriber line 122A.

In the above example, the controller 150 maintains a database of the availability of the interface units 142A . . .

142M to handle an XDSL service request. Alternatively, the central office could maintain a table or database of interface unit availability and provide controller 150 with the identification of the interface unit to be used.

The following steps illustrate the origination of a request by a subscriber for XDSL services implemented on an on demand basis.

1. For this illustrative example, assume that the subscriber requesting XDSL services is associated with subscriber line 122A. Utilizing customer premises equipment coupled to subscriber line 122A, the subscriber will initiate a request for XDSL communications such as by sending a request for services signal to the associated SIU 124A.
2. Using known signal detection techniques, the DSP 132 of SIU 124A will recognize the request for services signal.
3. SIU 124A will then generate a command on line 156 advising controller 150 of the request for XDSL services by the subscriber associated with line 122A.
4. The controller 150 transmits a service request on line 152 to the central office. The central office after checking the availability of one of lines 144A . . . 144M sends an instruction to controller 150 advising of the line, e.g. 144A, to be used in accommodating this request for services.
5. The controller 150 transmits a command signal on line 154 to HSDU 140 (selector 146) indicating the XDSL interface unit 142A to be connected to SIU 124A via line 148A.
6. The controller 150 preferably further generates a command signal on line 156 to SIU 124A to advise of the path completion.
7. Thus, an XDSL communication path is established between the subscriber's customer premise equipment associated with subscriber line 122A and high speed data line 144A which carries simplex inbound and outbound communications to the central office equipment.

It is also contemplated that the high speed services could be provisioned by a telecommunication system administrator, i.e. so called "nailed up". In this circumstance, one of lines 144A . . . 144M would be assigned on a good until changed basis to one of the SIUs, and hence to a subscriber served by that SIU. In this arrangement, the subscriber would always have immediate access to high speed facilities.

Although an explanation of embodiments of the present invention have been made above with reference to the drawings, the scope of the invention is defined by the claims which follow.

What is claimed is:

1. A line termination unit in a telecommunications system that supports plain old telephone services (POTS) and high speed data (HSD) services to a subscriber over a common two-wire subscriber line, the line termination unit comprising:

a line support circuit that connects to said common two-wire line and provides battery feed to said line, the line support circuit including means for receiving incoming analog POTS and HSD signals from the line and means for transmitting outgoing analog POTS and HSD signals to the line;

means coupled to the line support circuit for separating the received incoming analog signals into first and second signals where the first signals represent POTS information and the second signals represent HSD information; and means coupled to said separating means for converting the first signals into third digital signals having a format used for POTS signals by an associated central office and transmitting the third digital signals to the central office;

means coupled to said separating means for converting the second signals into fourth digital signals having a format used for HSD signals by an associated central office and transmitting the fourth digital signals to the central office.

2. The line termination unit according to claim 1 further comprising:

office interface means for receiving outgoing digital POTS and HSD signals from the central office;

means coupled to the office interface means for converting the outgoing digital POTS signals into fifth signals and for converting the outgoing digital HSD signals into sixth signals where the fifth and sixth signals are analog signals representing POTS information and HSD information, respectively;

means coupled to said converting means for combining the fifth and sixth signals into a combined signal that is coupled to the line support circuit which transmits the combined signal to the subscriber line.

3. The line termination unit according to claim 1 wherein said separating means comprises a first filter which permits said first signals to pass, the first filter does not carry current from said battery feed.

4. The line termination unit according to claim 3 wherein said separating means further comprises a second filter which permits said second signals to pass, the second filter does not carry current from said battery feed.

5. The line termination unit according to claim 1 wherein said line support circuit has sufficient frequency bandwidth to convey the HSD information which requires a higher bandwidth than bandwidth needed to convey the POTS information.

6. The line termination unit according to claim 1 wherein the HSD services consists of asynchronous digital subscriber loop (ADSL) services.

7. The line termination unit according to claim 1 wherein said POTS and HSD signals are concurrently processed by the line termination unit.

8. A multiple line termination unit in a telecommunications system that supports plain old telephone services (POTS) and high speed data (HSD) services for N subscribers over common two-wire subscriber lines where N is a positive integer greater than one, the multiple line termination unit comprising:

a plurality of subscriber interface units (SIU) for connection to the respective two-wire subscriber lines, each SIU provides battery feed to a respective two-wire subscriber line and includes means for receiving incoming analog POTS and HSD signals from the line and means for transmitting outgoing analog POTS and HSD signals to the line, each SIU provides an interface between analog POTS signals on the associated subscriber line and digitized POTS signals communicated with the central office;

high speed data unit (HSDU) which supports M concurrent HSD channels where M is a positive integer less than N, the HSDU comprises a selector which is coupled to each SIU, the selector controlling which of the SIUs will be coupled to one of said HSD channels.

9. The multiple line termination unit according to claim 8 further comprising:

a controller coupled to an associated central office, the HSDU, and each SIU, the controller providing call processing communications including instructions that control the operation of said selector.

10. A line termination unit in a telecommunications system that supports plain old telephone services (POTS) and high speed data (HSD) services to a subscriber over a common two-wire subscriber line, the line termination unit terminating the subscriber line at a switching system end of the line, the line termination unit comprising:

a line support circuit that connects to said common two-wire line, the line support circuit including a receiver that receives incoming analog POTS and HSD signals from the line and a transmitter that transmits outgoing analog POTS and HSD signals to the line;

signal splitter, coupled to the line support circuit, separates the received incoming analog signals into first and second signals where the first signals represent POTS information and the second signals represent HSD information; and converter, coupled to said signal splitter, converts the first signals into third digital signals having a format used for POTS signals by an associated central office and transmits the third digital signals to the central office, said converter converts the second signals into fourth digital signals having a format used for HSD signals by an associated central office and transmits the fourth digital signals to the central office.

11. The line termination unit according to claim 10 further comprising:

interface to the central office receives outgoing digital POTS and HSD signals from the central office;

converter, coupled to the interface, converts the outgoing digital POTS signals into fifth signals and converts the outgoing digital HSD signals into sixth signals where the fifth and sixth signals are analog signals representing POTS information and HSD information, respectively;

combiner, coupled to said converter, combines the fifth and sixth signals into a combined signal that is coupled to the line support circuit which transmits the combined signal to the subscriber line.

12. The line termination unit according to claim 10 wherein said line support circuit has sufficient frequency bandwidth to convey the HSD information which requires a higher bandwidth than bandwidth needed to convey the POTS information.

13. The line termination unit according to claim 10 wherein the HSD services consists of asynchronous digital subscriber loop (ADSL) services.

14. The line termination unit according to claim 10 wherein said POTS and HSD signals are concurrently processed by the line termination unit.

15. The line termination unit according to claim 10 wherein said line support circuit provides battery feed to said line.

16. The line termination unit according to claim 15 wherein said signal splitter comprises a first filter which permits said first signals to pass, the first filter does not carry current from said battery feed.

17. The line termination unit according to claim 16 wherein said signal splitter further comprises a second filter which permits said second signals to pass, the second filter does not carry current from said battery feed.

18. A multiple line termination unit in a telecommunications system that supports plain old telephone services (POTS) and high speed data (HSD) services for N subscribers over N common two-wire subscriber lines where N is a positive integer greater than one, the multiple line termination unit comprising:

a plurality of subscriber interface units (SIU) that connect the respective two-wire subscriber lines, each SIU provides battery feed to a respective two-wire subscriber line and includes a receiver that receives incoming analog POTS and HSD signals from the line and a transmitter that transmits outgoing analog POTS and HSD signals to the line, each SIU provides an interface between analog POTS signals on the associated subscriber line and digitized POTS signals communicated with a central office;

high speed data unit (HSDU) which supports M concurrent HSD channels where M is a positive integer less than N, the HSDU comprises a selector which is coupled to each SIU, the selector controls which of the SIUs will be coupled to one of said HSD channels.

19. The multiple line termination unit according to claim 18 further comprising:

a controller coupled to the central office, the HSDU, and each SIU, the controller providing call processing communications including instructions that control the operation of said selector.

20. A line termination unit in a telecommunications system that supports conventional telephone services (TS) and high speed data (HSD) services to a subscriber over a subscriber line, the line termination unit terminating the subscriber line at a switching system end of the line, the line termination unit comprising:

a line support circuit that connects to said subscriber line and includes a receiver that receives incoming TS and HSD signals from the line and a transmitter that transmits outgoing analog TS and HSD signals to the line;

signal splitter, coupled to the line support circuit, separates the received incoming signals into first and second signals where the first signals represent TS information and the second signals represent HSD information; and converter, coupled to said signal splitter, converts the first signals into third digital signals having a format used for TS signals by an associated central office and transmits the third digital signals to a central office, said converter converts the second signals into fourth digital signals having a format used for HSD signals by the central office and transmits the fourth digital signals to the central office.

21. The line termination unit according to claim 20 wherein said TS and HSD signals are concurrently processed by the line termination unit.

22. A method for processing concurrent plain old telephone services (POTS) and high speed data (HSD) services carried over a subscriber line at a termination at a central office end of the subscriber line comprising the steps of:

supplying a battery feed current to the subscriber line;

receiving incoming analog POTS and HSD signals from the line and transmitting outgoing POTS and HSD signals to the line;

separating the received incoming analog signals into first and second signals where the first signals represent POTS information and the second signals represent HSD information; and converting the first signals into third digital signals having a format used for POTS signals by the central office and transmitting the third digital signals to the central office;

converting the second signals into fourth digital signals having a format used for HSD signals by the central office and transmitting the fourth digital signals to the central office.

23. The method according to claim 21 wherein said separating step comprises using at least one filter which permits one of said first and signals to pass, and disposing said one filter so that current from said battery feed does not flow through said one filter.

* * * * *